United States Patent [19]
Dane

[11] 3,796,115
[45] Mar. 12, 1974

[54] WIRE STRIPPING TOOL

[76] Inventor: Robert L. Dane, 3140 Talmadge Rd., Toledo, Ohio 43606

[22] Filed: Sept. 25, 1972

[21] Appl. No.: 292,088

[52] U.S. Cl. ............................. 81/9.5 B, 30/91.2
[51] Int. Cl. ..... H02g 1/12, B21f 13/00, B26b 27/00
[58] Field of Search ............ 81/9.5 B, 9.5 R, 9.5 A; 30/90.8, 91.2

[56] References Cited
UNITED STATES PATENTS

| | | | |
|---|---|---|---|
| 520,818 | 6/1894 | Bettinger | 30/91.2 |
| 2,667,094 | 1/1954 | Potter | 81/9.5 B X |
| 2,695,537 | 11/1954 | Imman et al. | 30/91.2 |
| 1,685,977 | 10/1928 | Bollerman | 30/91.2 |

FOREIGN PATENTS OR APPLICATIONS

| 1,046,133 | 12/1958 | Germany | 81/9.5 B |
|---|---|---|---|

*Primary Examiner*—James L. Jones, Jr.
*Attorney, Agent, or Firm*—Alan J. Steger

[57] ABSTRACT

A wire stripping tool is provided which is capable of stripping a predetermined depth and length of insulation from the end of various size insulated wires. A generally U-shaped frame member has the free ends of its leg portions bent inwardly into parallel overlapping relationship with each other to form reciprocating stripping jaws. Each of these reciprocating stripping jaws has a mating V-shaped cutting edge formed therein which cooperate to form an adjustable wire receiving aperture therebetween. A pair of telescoping spacer members are positioned between the legs of the frame member and adjustable laterally to control the amount of movement of the cutting edges toward one another for regulation of the depth of the wire insulation being removed. The telescoping spacer members, which serve as a stop for the wire to be stripped, are also adjustably mounted for longitudinal movement relative to the legs of the frame member and the stripping jaws for regulation of the length of insulation that is to be removed from the wire. This tool incorporates easy-to-read numerical gauges to facilitate accurate adjustment for the desired length and size (diameter) of wire that is to be stripped.

6 Claims, 3 Drawing Figures

WIRE STRIPPING TOOL

BACKGROUND OF THE INVENTION

1. Field of the Invention

This invention relates to wire stripping devices and, more particularly, it relates to a compact wire stripping tool which is adjustable to automatically strip a predetermined diameter and length of insulation from the end of various size insulated wires.

2. Description of the Prior Art

The use of insulated wire has increased proportionately with the overwhelming growth in the electrical products industry. Each time a connection is made with an insulated wire, a portion of the insulation must be removed or stripped from the end thereof so that the conductor is exposed and available for electrical connection. A variety of tools have been utilized for the purpose of stripping the insulation from wire. One such tool is disclosed in U.S. Pat. No. 1,490,459 to Alan R. Ferguson for "Wire Stripper" on Apr. 15, 1924. This tool contains no adjustment to regulate either the depth of the cut into the insulation to be removed or the length of the insulation to be removed, but rather relies on the eyesight and manual dexterity of the user. A more sophisticated stripping tool is disclosed in U.S. Pat. No. 3,087,363 to Robert L. Jacobs for "Hand Wire Stripper" on Apr. 30, 1963. This tool is adapted to both grip and strip the wire simultaneously by providing stripper members which are movable relative to the gripping members. However, this tool also fails to provide automatic regulation means to preset the depth and length of insulation that is to be removed from the wire.

There is an increasing occurrence today of situations where the exact length of insulation that is to be stripped from the conductor portion of the wire is specified. An example of the latter is the increasing use of wire nuts which necessitate that a specific length of insulation be removed for proper connection. Currently available stripping tools result in a hit-and-miss type operation whereby the user must approximate both the diameter and the length of the insulation to be removed. Thus, there has been a long-felt need for a relatively simple and economical wire stripping tool which will strip a predetermined depth and length of insulation from various size insulated wires.

SUMMARY OF THE INVENTION

It is, therefore, an object of the present invention to provide a unique wire stripping tool which is capable of stripping a predetermined depth and length of insulation from various size insulated wires rapidly and accurately.

The wire stripping tool of this invention incorporates a generally U-shaped frame member which has the free ends of its leg portions bent inwardly into parallel overlapping relationship with each other to form reciprocating stripping jaws. Each of these reciprocating stripping jaws has a mating V-shaped cutting edge formed therein which cooperate to form an adjustable wire-receiving aperture therebetween. A pair of telescoping spacer members are positioned between the legs of the frame member and adjustable laterally to control the amount of movement of the cutting edges toward one another for regulation of the depth of the wire insulation being stripped. The telescoping spacer members, which serve as a stop for the wire being stripped, are also adjustably mounted for longitudinal movement relative to the legs of the frame member and the stripping jaws for regulation of the length of insulation that is to be removed from the wire. This tool incorporates easy-to-read numerical gauges to facilitate accurate adjustment for the desired length and gauge (diameter) of wire that is to be stripped.

Therefore, the wire stripping tool which is provided by this invention is well suited to be used in any application where various size wires are to be stripped to predetermined lengths. The stripping tool of this invention enables the user to preset the tool for whatever gauge wire he is stripping and for whatever length of bare conductor is desired. This is particularly helpful for applications where the user is repeatedly stripping the same gauge wire to the same length. In this instance the operator may preset the tool for the given wire gauge and length and then automatically strip the wires in the desired manner.

In operation the insulated wire that is to be stripped is placed through the stripping aperture formed by the reciprocating stripping jaws until its end abuts against the telscoping spacer members. The cutting tool may then be squeezed until the adjustable spacer members provide a stop based on the gauge wire that is being stripped. The tool is then rotated so that the cutting edges on the stripping jaws will cut through the insulation down to the conductor wire. The tool is then pulled toward the end of the wire thereby removing the insulation and leaving a predetermined length of bare conductor wire.

Other objects, features, and advantages of this invention will become apparent upon reference to the following detailed description and the accompanying drawings which illustrate a preferred embodiment of the invention.

IN THE DRAWINGS

DESCRIPTION OF THE PREFERRED EMBODIMENT

Figure 1:
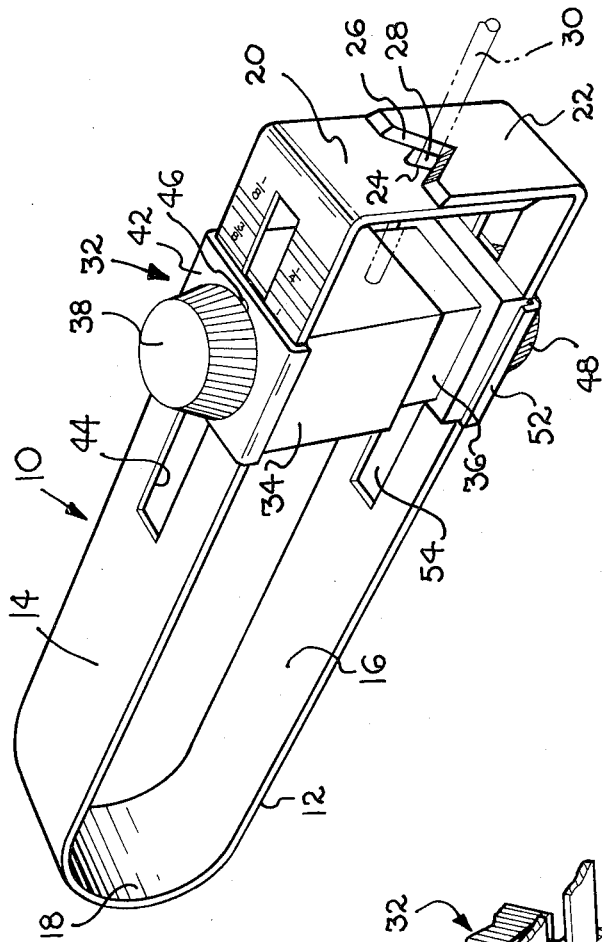
FIG. 1 is a perspective view of a wire stripping tool incorporating the features of this invention.
Figure 2:
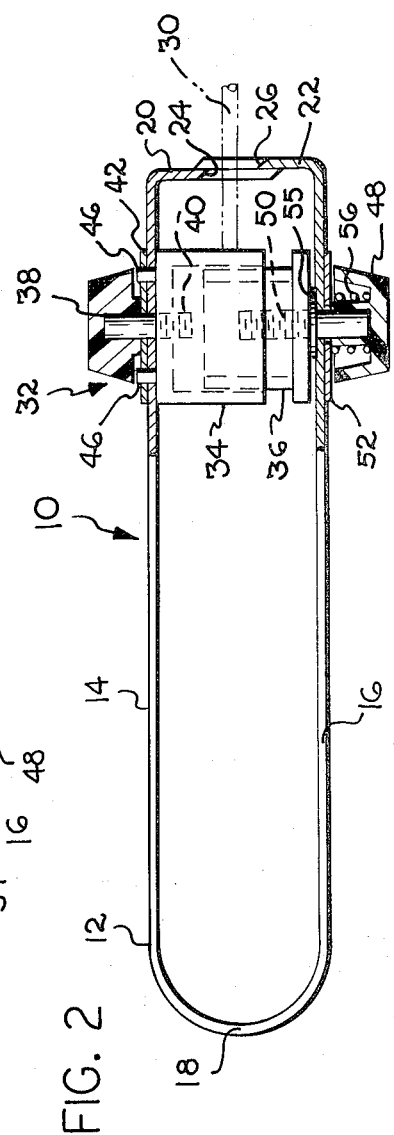
FIG. 2 is a front elevation view with parts broken away in section of the wire stripping tool of FIG. 1.

Referring to the drawings, a wire stripping tool incorporating the features of this invention is shown and indicated generally by the numeral 10. The wire stripping tool 10 incorporates as its main structural component a U-shaped frame member 12 which has a pair of leg portions 14 and 16 joined by a curved connecting member 18. The ends of the leg portions 14 and 16 are bent inwardly into parallel overlapping relationship to form a pair of reciprocating stripping jaws 20 and 22. Each of these reciprocating stripping jaws 20 and 22 has a V-shaped cutting edge 24 and 26, respectively, formed therein which cooperate to form an adjustable wire-receiving aperture 28 therebetween. As shown in FIGS. 1 and 2, the wire-receiving aperture 28 is adjustable in size by moving the reciprocating stripping jaws 20 and 22 to accommodate various size insulated wires such as the one shown by the numeral 30.

An adjusting mechanism which cooperates with the frame 12 to enable the user to preset the wire stripping tool 10 for a desired length and gauge of wire to be stripped is indicated generally by the numeral 32 in each of the Figures. The adjusting mechanism 32 features a pair of telescoping spacer members 34 and 36. Each of the spacer members 34 and 36 has an identical square or rectangular cross section and is sized so that the spacer member 36 will easily slide within the spacer member 34.

The spacer member 34 is fastened to the leg 14 of the frame 12 by means of a knob 38 having a threaded bolt 40 thereon and a slide plate 42. As can be seen in FIG. 1, the leg 14 of the frame member 12 has a longitudinal slot 44 formed therein. The threaded bolt 40 on the tightening knob 38 is adapted to be inserted through an aperture in the slide plate 42 and through the slot 44 in the frame 12 into threaded engagement with the spacer member 34. As can be seen in FIG. 1, the various distances of the slide plate 42 from the stripping jaws 20 and 22 are measured and indicated on the face of leg member 14 on frame 12. Thus, the position of the adjusting mechanism 32 can be varied by loosening the threaded bolt 40 and sliding the entire mechanism relative to the indicated settings on the frame member 12. When a desired setting has been reached, the knob 38 is rotated to thereby tighten and affix the position of the spacer member 34 and the adjusting mechanism 32 relative to the leg portion 14 of the frame member 12. It should be noted additionally that spacer member 34 has a pair of guide pins 46 on its upper surface which is inserted into an aperture in slide plate 42 to prevent rotation of the spacer member 34 relative to slide plate 42 and the frame 12. The guide pins 46 preferably should be slightly larger in diameter than the threaded bolt 40 so as to prevent contact of the pin 40 with the edges of the slot 44 in frame member 12 and the damage to the threads on bolt 40 that would result from such contact. These guide pins 46 also serve to balance the movement of the adjusting mechanism 32 as it slides relative to frame member 12.

Figure 3:
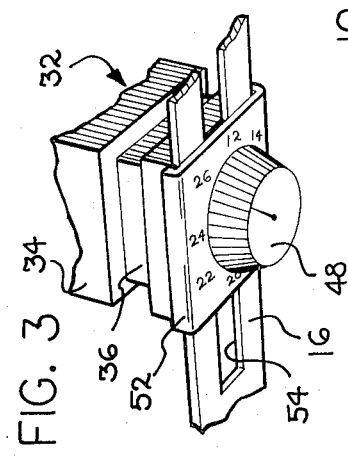
FIG. 3 is a partial perspective view of the wire gauge adjusting portion of the wire stripping tool of FIGS. 1 and 2.

The spacer member 36 is attached to leg portion 16 of frame member 12 by means of a knob 48 which has a threaded driving bolt 50 thereon and a slide plate 52. The threaded driving bolt 50 extends through an aperture in the slide plate 52 and also through a longitudinal slot 54 formed in leg portion 16 of frame 12 before it threadingly engages the spacer member 36. A generally C-shaped retaining ring 55 snaps over a notch on the driving bolt 50 on the inside of leg portion 16 of frame 12 so that knob 48 becomes free-turning. The spacer member 36 along with its knob 48 and slide panel 52 are movable relative to the leg portion 16 of the frame 12 by sliding along the slot 54 in the leg portion 16. The knob 48 includes a spring 56 which is positioned around the threaded driving bolt 50 between the top panel of the knob 48 and the slide panel 52. This spring 56 creates sufficient force against the knob 48 and the slide panel 52 to prevent undesirable rotation of the knob 48 from its desired setting. The position of the spacer 36 relative to the spacer member 34 can be adjusted by rotating knob 48. Rotation of knob 48 causes threaded driving bolt 50 to drivingly change the position of spacer member 36 relative to spacer member 34. As can be seen in FIG. 2, upward movement of spacer member 36 to a position closer to spacer member 34 limits the relative movement of stripping jaw 20 relative to stripping jaw 22. Thus, limiting the movement of the jaws towards each other by moving spacer 36 closer to spacer 34 results in a larger diameter wire-receiving aperture 28 to thereby accommodate larger gauge wire. Conversely, positioning the spacer members 36 and 34, as shown in FIG. 2, allows maximum movement of cutting jaws 20 and 22 towards each other thereby resulting in a small wire-receiving aperture 28 to accommodate smaller diameter insulated wire. It can be seen in FIG. 3 that the slide plate 52 has various positions noted thereon which correspond to various size or gauge wires. For example, in FIG. 3 the indicator on knob 48 is pointing generally to the position designated as 26 gauge wire. As the knob in FIG. 3 is rotated to the left, or counterclockwise, the spacer member 36 is driven upwardly into closer relationship with the spacer member 34. This adjustment results in less travel of the stripping jaws 20 and 22 relative to each other and a larger diameter wire-receiving aperture 28 which then corresponds to the larger diameter gauge wire, such as 12 or 14 gauge insulated wire. When the knob is rotated to the position shown in FIG. 3, the spacer member 36 is retracted to the position shown in FIG. 2 thereby permitting maximum movement of the cutting jaws 20 and 22 towards each other so as to create a small diameter wire-receiving aperture 28 for accommodating only small diameter wire such as 24 or 26 gauge insulated wire.

Therefore, it can be seen by loosening knob 38 the entire adjusting mechanism 32 may be moved longitudinally relative to the stripping jaws 20 and 22 to adjust for different lengths of wire that are to be stripped. Also, it can be seen that the movement of the stripping jaws can be adjusted to correspond with a given wire gauge by rotating the knob 48 which adjusts the relative position of the spacer members 36 and 34. If it is desired, for example, to strip a 26 gauge insulated wire so that one-half inch of insulation is removed, the adjusting mechanism 32 is adjusted relative to the stripping jaws 20 and 22 to the position shown approximately in FIG. 1 and the knob 48 is rotated to the approximate position shown in FIG. 3. The chosen insulated wire is inserted through the wire-receiving aperture 28 until its free end abuts the side of the spacer member 34 to approximate the location of the wire 30 in FIGS. 1 and 2. The stripping tool 10 is then grasped so that the leg portions 14 and 16 and the cutting jaws 20 and 22 are forced toward each other. This squeezing motion will force the cutting edges 24 and 26 through the insulation on the wire 30 to a predetermined depth which corresponds to the diameter of the conductor portion of the wire being stripped. This depth of cut is automatically determined by setting the knob 48 for the particular gauge wire that is being stripped. The stripping tool 10 is then rotated relative to the wire 30 to insure complete severance of the insulation and the tool is then pulled toward the free end of the wire 30 thereby removing a predetermined length of insulation from the conductor portion of the wire 30. It should be understood that this operation for a one-half inch length removal of the insulation from a 26 gauge wire may be repeated automatically for as many times as desired without changing the adjustments on the stripping tool. However, either the length or the gauge wire being stripped may be adjusted as described before at any given time. Therefore, it should be clear from the preceding description that a unique wire stripping tool is provided by this invention which is capable of automatically stripping a predetermined length of insulation from a given gauge of insulated wire without damaging the remaining bare conductor portion of the insulated wire.

I claim:

1. A wire stripping device for stripping a predetermined length and depth of insulation from an insulated wire comprising, in combination:

a frame member including a pair of leg portions connected at one end and having their free ends bent inwardly into parallel overlapping relationship to form reciprocating stripping jaws, said leg portions each having a longitudinally-extending slot formed therein, each of said reciprocating stripping jaws having a mating cutting edge formed therein, said cutting edges cooperating to form a wire-receiving aperture therebetween;

and an adjustment mechanism slidably mounted to and between said leg portions of said frame means, said adjustment mechanism including first and second spacer members positioned between said leg portions of said frame member, first and second slide plates positioned in overlying relationship to said leg portions and having apertures formed therein, and first and second threaded adjustment bolts, said first bolt being inserted inwardly through the aperture in said first slide plate and through the slot in said one of said leg portions into threaded engagement with said first spacer member to adjust the position of said adjustment mechanism relative to said reciprocating stripping jaws to thereby control the distance of insertion of the insulated wire through said wire-receiving aperture and regulate the length of insulation to be stripped from said insulated wire, and said second bolt being inserted inwardly through the aperture in said second slide plate and through the slot in the other of said leg portions into threaded engagement with said second spacer member and being rotatable to adjust the position of said second spacer member relative to said first spacer member to control the travel of the reciprocating stripping jaws towards one another to thereby regulate the depth of insulation to be stripped from said insulated wire.

2. A wire stripping device as set forth in claim 1 wherein said first and second threaded adjustment bolts each include a threaded shaft portion and a grasping knob at one end thereof.

3. A wire stripping device as set forth in claim 2 wherein said adjustment mechanism further includes a retaining ring which snaps into a notch in said second bolt on the inside of the other of said leg portions.

4. A wire stripping device as set forth in claim 3 wherein said one of said leg portions has distance markings thereon indicating the distance from said stripping jaws for easy adjustment of the position of said adjustment mechanism to correspond with desired lengths of insulation to be stripped from an insulated wire.

5. A wire stripping device as set forth in claim 4 wherein said second slide plate has wire gauge markings thereon indicating various rotational positions of said second bolt which corresponds to various wire gauges.

6. A wire stripping device as set forth in claim 1 wherein said first and second spacer members are of mating rectangular cross-section and sized so that one of said spacer members telescopes within the other of said spacer members.

* * * * *